United States Patent
Lee et al.

(10) Patent No.: US 9,247,442 B2
(45) Date of Patent: Jan. 26, 2016

(54) METHOD AND APPARATUS FOR DETECTING ERROR IN AN IP-BASED BEARER INDEPENDENT CALL CONTROL ENVIRONMENT

(71) Applicant: Samsung Electronics Co. Ltd., Suwon-si, Gyeonggi-do (KR)

(72) Inventors: Kisun Lee, Seongnam-si (KR); Jounghwa Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 13/749,300

(22) Filed: Jan. 24, 2013

(65) Prior Publication Data
US 2013/0194909 A1 Aug. 1, 2013

(30) Foreign Application Priority Data
Jan. 26, 2012 (KR) .................. 10-2012-0007824

(51) Int. Cl.
*H04W 24/04* (2009.01)
*H04W 24/08* (2009.01)
*H04L 12/24* (2006.01)
*H04W 76/02* (2009.01)

(52) U.S. Cl.
CPC .......... *H04W 24/04* (2013.01); *H04L 41/0654* (2013.01); *H04W 24/08* (2013.01); *H04W 76/022* (2013.01)

(58) Field of Classification Search
None
See application file for complete search history.

(56) References Cited

U.S. PATENT DOCUMENTS

| | | | |
|---|---|---|---|
| 2006/0193311 A1* | 8/2006 | Kim et al. | 370/356 |
| 2006/0245350 A1* | 11/2006 | Shei et al. | 370/216 |
| 2007/0053343 A1* | 3/2007 | Suotula et al. | 370/352 |
| 2007/0183347 A1* | 8/2007 | Gu et al. | 370/258 |
| 2008/0219225 A1* | 9/2008 | Krishnamurthy et al. | 370/338 |
| 2010/0027416 A1* | 2/2010 | Beauford | 370/225 |
| 2010/0161325 A1* | 6/2010 | Hellwig et al. | 704/229 |
| 2012/0207148 A1* | 8/2012 | Mukherjee et al. | 370/352 |

* cited by examiner

*Primary Examiner* — Yemane Mesfin
*Assistant Examiner* — Peter Chen
(74) *Attorney, Agent, or Firm* — Jefferson IP Law, LLP

(57) ABSTRACT

A call monitoring method for detecting an error in a Bearer-Independent Call Control (BICC) environment using an Internet Protocol (IP) as a bearer is provided, in which an MSC receives connection information about a called exchange from another MSC, requests IP resource allocation for configuring a termination to a Media GateWay (MGW) controlled by the MSC based on the received connection information about the called exchange, determines, upon receipt of a resource allocation failure message from the MGW, whether a cause of a resource allocation failure is an IP allocation error, and transmits the resource allocation failure message to a resource manager, if the cause of the resource allocation failure is an IP allocation error.

13 Claims, 8 Drawing Sheets

METHOD AND APPARATUS FOR DETECTING ERROR IN AN IP-BASED BEARER INDEPENDENT CALL CONTROL ENVIRONMENT

PRIORITY

This application claims the benefit under 35 U.S.C. §119 (a) of a Korean patent application filed in the Korean Intellectual Property Office on Jan. 26, 2012 and assigned Serial No. 10-2012-0007824, the contents of which are incorporated herein by reference.

BACKGROUND OF THE INVENTION

1. Field of the Invention

The present invention relates to a method and apparatus for detecting an Internet Protocol (IP) allocation error and handling the detected IP allocation error without intervention of a manager in an IP-based Bearer-Independent Call Control (BICC) environment.

2. Description of the Related Art

In error detection in Bearer-Independent Call Control (BICC) of a mobile communication system, when an Asynchronous Transfer Mode (ATM) bearer is used, an ATM layer can detect an error even though bearer resource allocation is failed.

In the case of an Internet Protocol (IP) bearer, however, even when a bearer is successfully established between exchanges by normal resource allocation, a call error may be generated on a user plane during data transmission and reception between Media GateWays (MGWs). The call error cannot be detected without intervention of a manager. The resulting concentration of calls on a specific MGW leads to inefficient resource management and increased server load.

Accordingly, there is a need for a method for detecting an error to thereby manage resources and load.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a call monitoring method and apparatus for detecting an error and thus recovering a call or selecting an alternative route in the event of Internet Protocol (IP) resource allocation failure in a Bearer-Independent Call Control (BICC) environment using IP bearers.

In accordance with an aspect of the present invention, there is provided a call monitoring method for detecting an error at a Mobile Switching Center (MSC) in a BICC environment using an IP as a bearer, in which connection information about a called exchange is received from another MSC, IP resource allocation for configuring a termination is requested to a Media GateWay (MGW) controlled by the MSC based on the received connection information about the called exchange, it is determined, upon receipt of a resource allocation failure message from the MGW, whether a cause of a resource allocation failure is an IP allocation error, and the resource allocation failure message is transmitted to a resource manager, if the cause of the resource allocation failure is an IP allocation error.

In accordance with another aspect of the present invention, a call monitoring method for detecting an error at an MSC in a BICC environment using an IP as a bearer is provided. The method includes receiving an error message indicating an IP bearer error in a connection to another MGW connected to an MGW controlled by the MSC from the MGW controlled by the MSC, and isolating a route directed to an MSC connected to an MSC connected to the other MGW based on the received error message.

In accordance with a further aspect of the present invention, a call monitoring apparatus for detecting an error at an MSC in a BICC environment using an IP as a bearer, in which a first transceiver transmits and receives connection information about a called exchange from another MSC, a second transceiver transmits and receives an IP resource allocation request for configuring a termination and information indicating whether an IP resource allocation has been successful to and from an MGW controlled by the MSC based on data transmitted and received through the first transceiver, a resource manager stores the information indicating whether the IP resource allocation has been successful, transmitted and received through the second transceiver, and a controller determines whether an IP error has occurred based on data stored in the resource manager.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the attached drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Detailed descriptions of generally known functions and structures will be avoided herein in order to avoid obscuring the subject matter of the present disclosure.

The advantages and features of the present invention and a method for achieving them will become apparent from the following detailed description of exemplary embodiments of the present invention with reference to the attached drawings.

In addition, each block may represent a part of a module, a segment, or code including one or more executable instructions to perform a specific logical function(s). It should be noted that functions described as performed in blocks are performed in a changed order in alternative exemplary embodiments. For example, two adjacent blocks may perform functions substantially at the same time or the operation order of the blocks may be reversed according to the functions in some cases.

Figure 1:
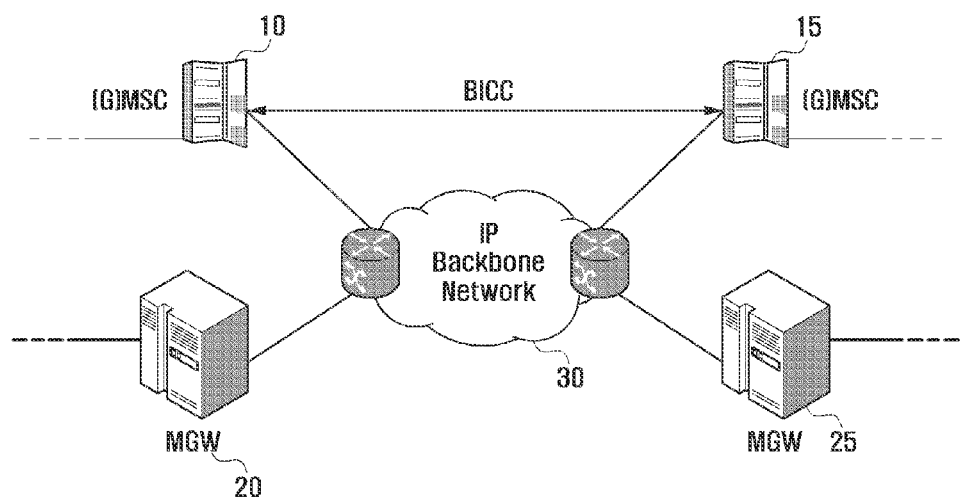
FIG. 1 illustrates a basic configuration of network interworking through Internet Protocol (IP)-based Bearer-Independent Call Control (BICC) according to an exemplary embodiment of the present invention.

FIG. 1 illustrates a basic configuration of network interworking through Internet Protocol (IP)-based Bearer-Independent Call Control (BICC) according to an exemplary embodiment of the present invention.

Referring to FIG. 1, network interworking through IP-based BICC according to an exemplary embodiment of the present invention may be implemented by establishing BICC interworking between a plurality of Mobile Switching Centers (MSCs) 10 and 15 and connecting Media GateWays (MGWs) 20 and 25 controlled respectively by the MSCs 10 and 15 to each other through an IP backbone network 30.

BICC is a signaling protocol used to support Integrated Services Digital Network (ISDN) service for network and terminal services over a broadband backbone network. BICC is a network-to-network interface call control protocol supporting voice service and packet service including data and video over communication networks in which circuit-switched services including ISDN voice service are provided using various transport technologies such as Asynchronous Transfer Mode (ATM), IP, etc. as well as Time Division Multiplexing (TDM).

Since BICC also functions to forward a call signal and voice data from a Public Switched Telephone Network (PSTN) or an intelligent network to a packet-based communication network, BICC can be used for interworking between soft switches used to deploy a future-generation network.

BICC is an extension based on Signaling System 7 (SS7) used for a public circuit-switched network. Therefore, a telephone network employing BICC is readily adapted to a new service on a future-generation backbone and easily interworks with a high-speed future-generation packet-based network by use of BICC. Advantageously, BICC enables evolution from legacy networks to future-generation networks and extension of related-art protocols to the networks.

Each of the MSCs 10 and 15 may be connected to one or more Radio Network Controllers (RNCs). The RNCs may be connected to User Equipments (UEs).

The MSCs 10 and 15 serve as call agents operating to set up a call over a communication network. The MGWs 20 and 25 may perform a switching function for bearer setup under the control of the MSCs 10 and 15.

To provide circuit-switched call services to UEs, the MSCs 10 and 15 may provide call control and mobility control regarding circuit-switched calls by interworking with an RNC and a Home Location Register (HLR). A Gateway MSC (GMSC) is an MSC connected to a circuit-switched network and thus serving as a gateway. MSCs illustrated in the later-described drawings may be GMSCs.

The MGWs 20 and 25 may terminate a bearer within the circuit-switched network and interface the terminated bearer to an external network. The MGWs 20 and 25 may perform conversion between media (e.g., audio and video coding conversion) and echo cancelation that are required depending on the characteristics of the interfaced external network. Besides, the MGWs 20 and 25 may support H.248 protocol functionalities for interfacing with other MSC servers and manage internal resources.

Figure 2:
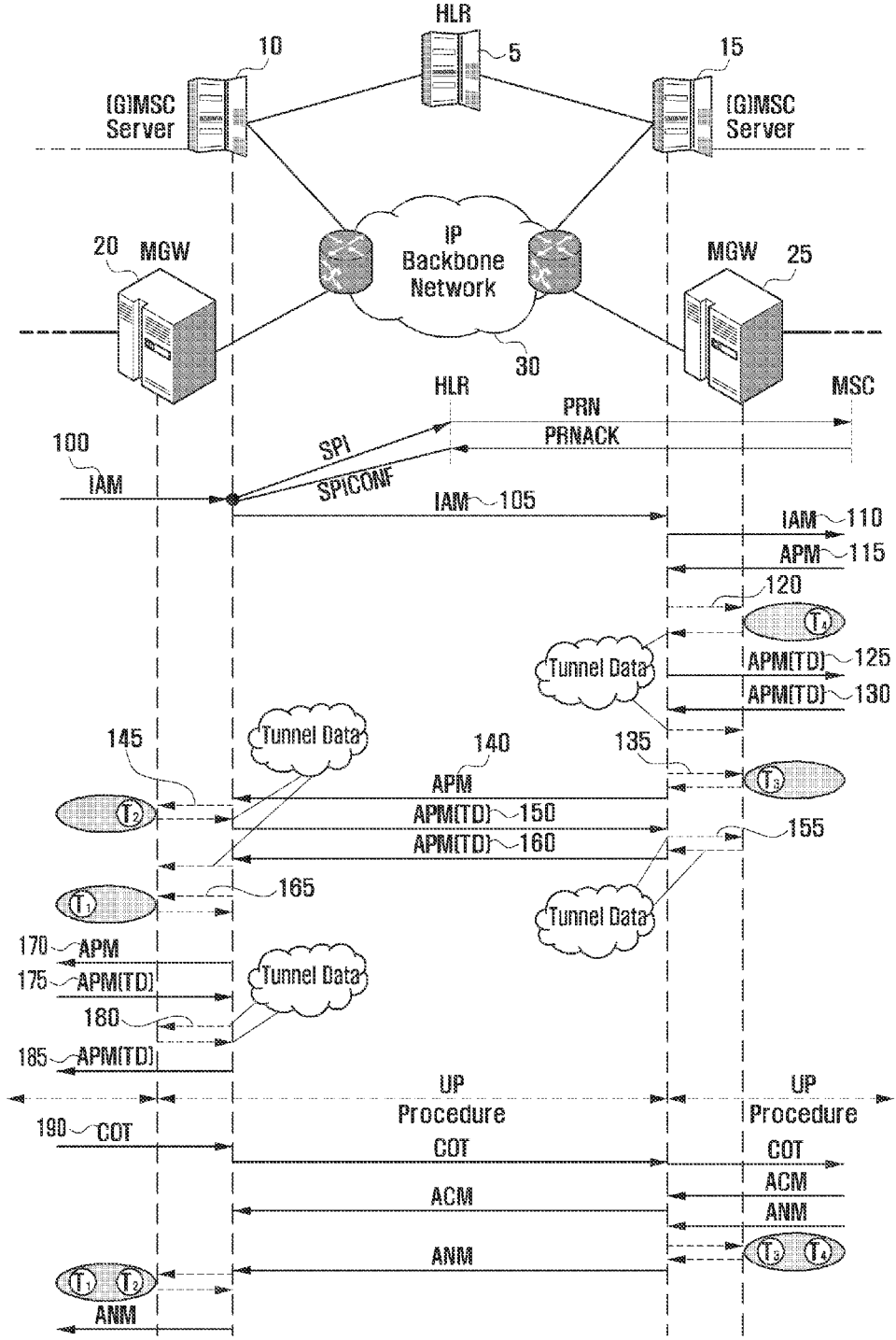
FIG. 2 illustrates a call setup method in a BICC interworking environment using IP bearers according to an exemplary embodiment of the present invention.

FIG. 2 illustrates a call setup method in a BICC interworking environment using IP bearers according to an exemplary embodiment of the present invention.

With reference to FIG. 2, a case of successful BICC IP call setup will be described. In FIG. 2, the MSC 10 is connected to the MSC 15. In addition, the MSC 10 is connected to the MGW 20 and the MSC 15 is connected to the MGW 25, via IP backbone network 30 for communication. An HLR 5 may be configured so as to establish a connection and control a call between the MSCs 10 and 15.

In step 100, a new BICC Initial Address Message (IAM) call is incoming and a Mobile Switching Roaming Number (MSRN) is acquired by performing a Send Routing Information (SRI) request procedure for searching for information about a called subscriber. An MSC that allocates the MSRN to the called subscriber may be an adjacent MSC in FIG. 2 or an MSC not shown in FIG. 2.

A connection may be established with a called exchange connected to the called subscriber by allocating the MSRN. This step may be referred to as 'BICC outgoing'.

In step 105, the call is routed to the called exchange based on the MSRN allocated in step 100. The MSC 10 may route the call to the MSC 15 by an IAM.

In step 110, the MSC 15 may route the call again by the IAM received in step 105. The MSC 15 may be connected to an MSC of the called exchange or an MSC of another exchange located between the MSC 15 and the called exchange.

The MSC 15 may receive an Application Transport Mechanism (APM) message including a Codec negotiation result and Backbone network connection Identifier (ID) (BncId) information from the called exchange in step 115. A different amount of IP resources may be allocated in a different manner later based on the Codec negotiation result and the BncId information included in the APM message.

When the APM message is received, termination allocation can be requested to an MGW. A termination is a logical entity that generates and transmits media streams and control streams within a specific MGW. Upon generation, every termination has a termination ID allocated by an MGW. Each termination entity can be identified by its termination ID.

Data can be transmitted and received between a plurality of MGWs by configuring terminations between the MGWs. Different terminations may be configured according to the types of transmission streams. An MGW may allocate an ID to each termination and thus different terminations may be distinguished by their IDs. In an exemplary embodiment of the present invention, the IDs of terminations are T1 to T4, by way of example.

In step 120, the MSC 15 may request resource allocation for a T4 termination to the MGW 25 based on information included in the APM message received in step 115.

The MGW 25 may allocate IP resources based on a received APM message and transmit to the MSC 15 tunnel data carrying information about the allocated IP resources to the called exchange. The tunnel data may include at least one of allocated IP address information, port information, or media stream information.

The MSC 15 may transmit the tunnel data received in step 120 to the called exchange by an APM message in step 125. The destination of the APM message may be the called exchange. An MSC of the exchange that has received the APM message may receive tunnel data related to IP resources allocated by an MGW of the called exchange.

The MSC 15 may receive allocated tunnel information from the called exchange in step 130. The tunnel information may also be included in an APM message. In addition, the MSC 15 may transmit tunnel data of the received tunnel information to the MGW 25.

In step 135, the MSC 15 may request IP resource allocation for a T3 termination to the MGW 25, referring to the Codec negotiation result of the called exchange received in step 115. The amount of allocated IP resources may be controlled according to the Codec negotiation result. The MSC 15 receives an IP resource allocation result for the T3 termination from the MGW 25.

In step 140, the MSC 15 may transmit the Codec negotiation result and the Bide information received in step 115 to a preceding exchange by an APM message. The BncId information may be information received from the MGW 25. The term 'preceding exchange' is a relative concept from the perspective of progress of communication on a BICC route. The preceding exchange does not represent one absolute exchange. The preceding exchange of the MSC 15 may include the MSC 10 in the exemplary embodiment of the present invention.

In step 145, the MSC 10 may request IP resource allocation for a T2 termination to the MGW 20 based on the APM message received in step 140. The characteristics of allocated IP resources may vary according to the characteristics of information included in the APM message. For instance, a different bandwidth may be allocated according to the Codec negotiation result. The MSC 10 may receive allocated tunnel data for the T2 termination from the MGW 20. The tunnel data may also include at least one of IP address information, IP port information, or media stream information.

The MSC 10 may transmit the tunnel data received from the MGW 20 to the MSC 15 of a succeeding exchange in step 150. The term 'succeeding exchange' is also a relative concept from the perspective of a BICC route, not representing one absolute exchange.

The MSC 15 may transmit the tunnel data included in the APM message received from the MSC 10 of the preceding exchange to the MGW 25 in step 155. The MSC 15 may also receive tunnel data associated with IP resources that the MGW 25 allocates based on the received tunnel data.

The MSC 15 may transmit the tunnel data allocated by the MGW 25 in step 155 to the MSC 10 of the preceding exchange by an APM message in step 160. Then the MSC 10 may transmit tunnel data to the MGW 20 based on the tunnel data included in the received APM message.

In step 165, the MSC 10 may request IP resource allocation for a T1 termination to the MGW 20 based on the Codec negotiation result and the BncId information received in step 115. IP resources may be allocated in a different manner according to the received Codec negotiation result and the BncId information. The MGW 20 transmits a resource allocation response message to the MSC 10.

In step 170, the MSC 10 may transmit the Codec negotiation result and the BncId information used in step 165 to a preceding exchange by an APM message.

The MSC 10 may receive tunnel data associated with the preceding exchange from the preceding exchange in step 175. The tunnel data may include at least one of IP address information, IP port information, or media stream information about the preceding exchange.

In step 180, the MSC 10 may transmit the tunnel data received in step 175 to the MGW 20. The MGW 20 may transmit tunnel data regarding IP resource allocation for a T1 termination performed in step 165 to the MSC 10.

In step 185, the MSC 10 may transmit the tunnel data received from the MGW 20 in step 180 to the preceding exchange by an APM message. In this manner, a bearer is successfully established between the MGWs and thus User-Plane (UP) data can be transmitted through the bearer.

The MSC 10 receives a Continuity (COT) message indicating that the establishment of the bearer is complete from an adjacent MSC in step 190. When a specific MSC determines that the bearer has been successfully established from a Notify message received from an MGW controlled by the MSC, the specific MSC generates the COT message. When the COT message is transmitted to the called exchange, an Address Complete Message (ACM) may be received from the called exchange, indicating successful establishment.

Figure 3:
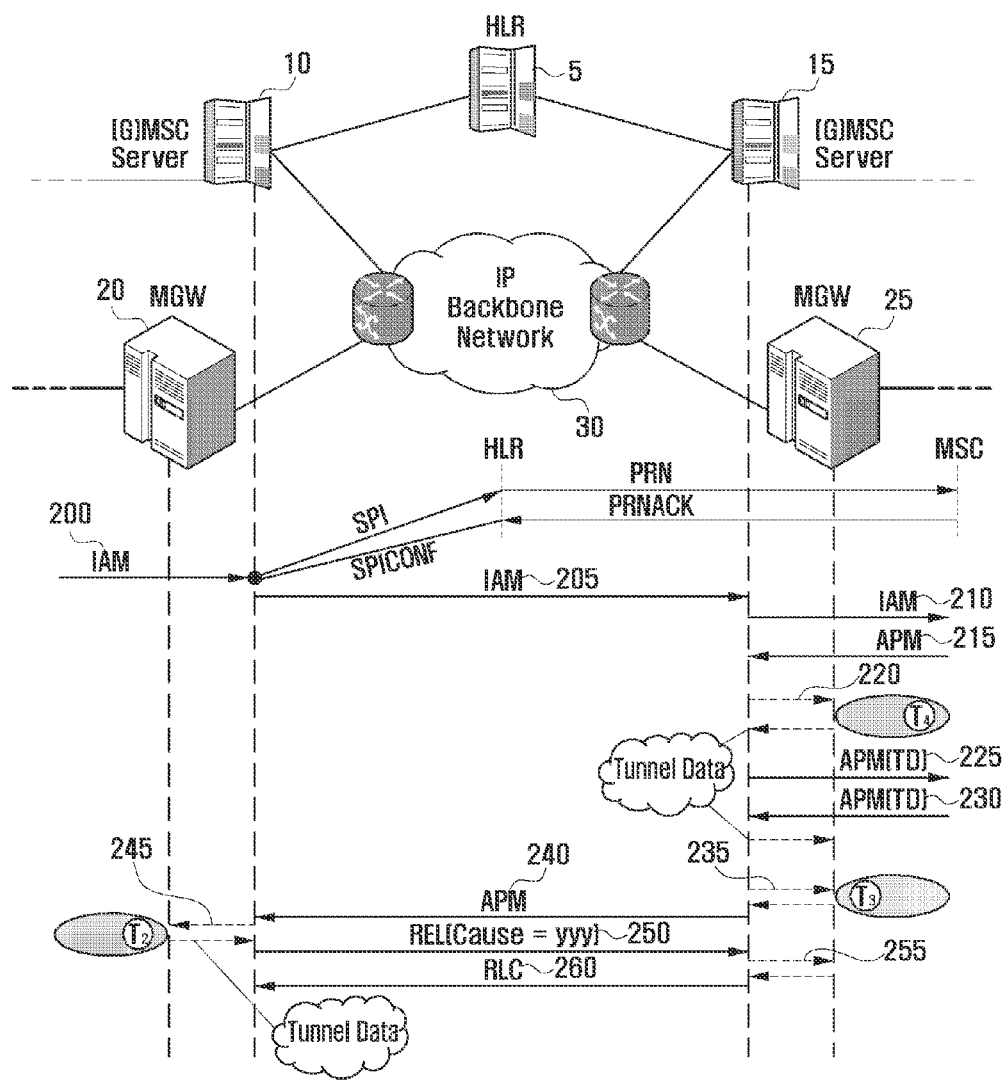
FIG. 3 illustrates a call monitoring method for detecting an IP bearer error according to an exemplary embodiment of the present invention.

FIG. 3 illustrates a call monitoring method for detecting an IP bearer error according to an exemplary embodiment of the present invention.

Referring to FIG. 3, the MSC 10 and the MSC 15 are connected to each other. The MSC 10 is connected to the MGW 20 and the MSC 15 is connected to the MGW 25, via IP backbone network 30 for communication. The HLR 5 may be configured so as to establish a connection and control a call between the MSCs 10 and 15.

In step 200, a new BICC IAM call is incoming and an MSRN is acquired by performing an SRI request procedure for searching for called subscriber information. An adjacent MSC in FIG. 3 or an MSC not shown in FIG. 3 may allocate the MSRN to a called subscriber. A connection may be established with a called exchange connected to the called subscriber by allocating the MSRN. This step may be referred to as 'BICC outgoing'.

In step 205, the call is routed to the called exchange based on the MSRN allocated in step 200. The MSC 10 may route the call to the MSC 15 by an IAM.

In step 210, the MSC 15 may route the call again by the IAM received in step 205. The MSC 15 may be connected to an MSC of the called exchange or an MSC of another exchange located between the MSC 15 and the called exchange.

The MSC 15 may receive an APM message including a Codec negotiation result and BncId information from the called exchange in step 215. A different amount of IP resources may be allocated in a different manner later based on the Codec negotiation result and the BncId information included in the APM message.

In step 220, the MSC 15 may request resource allocation for the T4 termination to the MGW 25 based on information included in the APM message received in step 215.

The MGW 25 may allocate IP resources based on the received APM message and transmit to the MSC 15 tunnel data carrying information about the allocated IP resources to the called exchange. The tunnel data may include at least one of allocated IP address information, port information, or media stream information.

The MSC 15 may transmit the tunnel data received in step 220 in an APM message to the called exchange in step 225. The destination of the APM message may be the called exchange. The MSC of the exchange that has received the APM message may receive tunnel data related to IP resources allocated by the MGW of the called exchange.

The MSC 15 may receive allocated tunnel information from the called exchange in step 230. The tunnel information may also be included in an APM message. In addition, the MSC 15 may transmit tunnel data of the received tunnel information to the MGW 25.

In step 235, the MSC 15 may request IP resource allocation for the T3 termination to the MGW 25, referring to the Codec negotiation result of the called exchange received in step 215. The amount of allocated IP resources may be controlled according to the Codec negotiation result. The MSC 15 receives an IP resource allocation result for the T3 termination from the MGW 25.

In step 240, the MSC 15 may transmit the Codec negotiation result and the BncId information received in step 215 to a preceding exchange by an APM message. The BncId information may be information received from the MGW 25.

In step 245, the MSC 10 may request IP resource allocation for the T2 termination based on the APM message received in step 240. The MGW 20 may fail in allocating IP resources to the T2 termination due to an IP resource error. In this case, the MGW 20 may transmit an <ADD REPLY> Megaco message with a predetermined Error Code value set in it to the MSC 10. The Error Code may have the same format in the MSCs 10 and 15 and the MGWs 20 and 25 by user setting.

If an allocation result value received from the MGW 20 indicates an IP error, the MSC 10 may provide the allocation result value to a resource manager in it. The resource manager may compare associated error values and determine whether an IP resource error has occurred based on a user-preset threshold.

In steps 250, 255, and 260, the MSC 10 notifies connected MSCs including the MSC 15 whether an IP resource allocation error has occurred. This notification is transmitted by a RELease (REL) message so that a procedure for recovering a call for which resource allocation has failed may be performed. Cause may be set to a value indicating an IP error in the REL message. Upon receipt of the REL message indicating IP error, an MSC may determine whether an adjacent MSC experiences an IP error. This will be described further below in greater detail.

Figure 4:
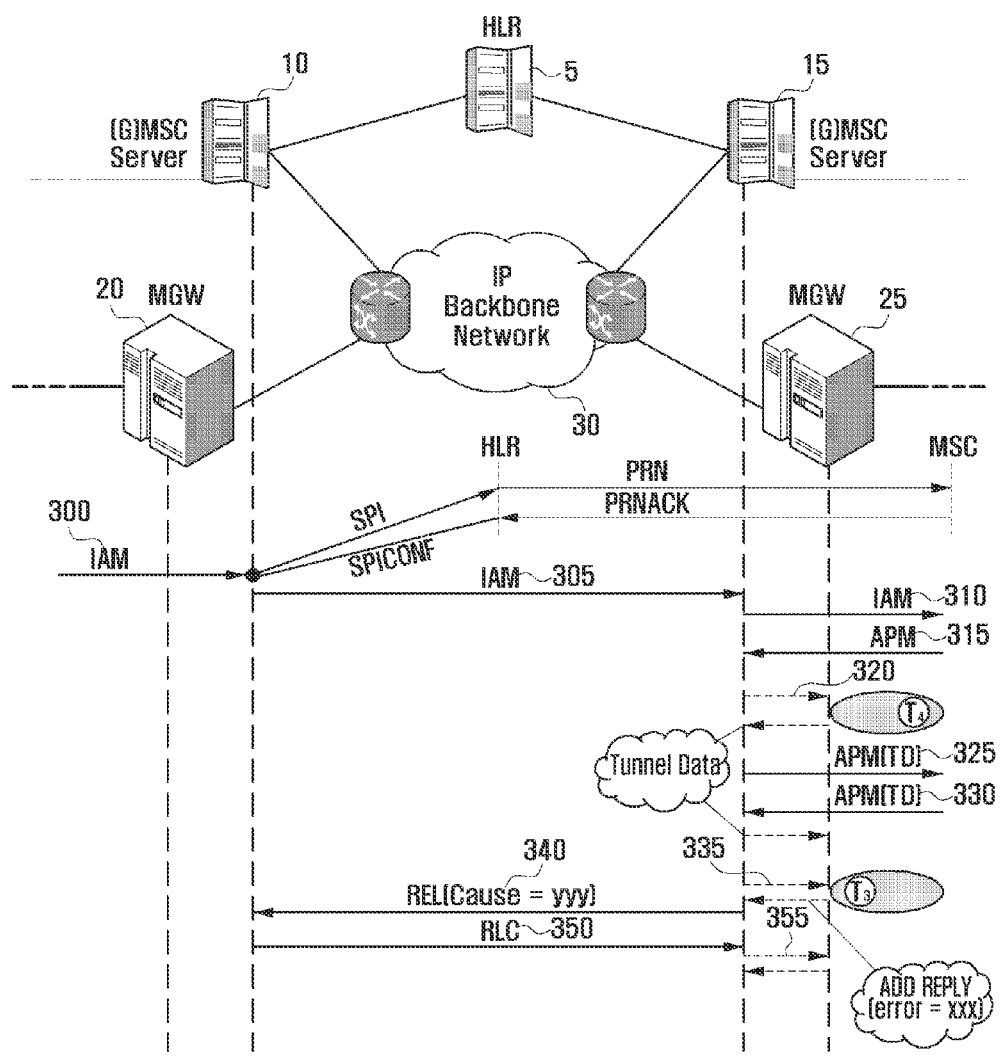
FIG. 4 illustrates a call monitoring method for detecting an IP bearer error according to an exemplary embodiment of the present invention.

FIG. 4 illustrates a call monitoring method for detecting an IP bearer error according to an exemplary embodiment of the present invention.

Referring to FIG. 4, the MSC 10 and the MSC 15 are connected to each other. The MSC 10 is connected to the MGW 20 and the MSC 15 is connected to the MGW 25, via IP backbone network 30 for communication. The HLR 5 may be configured so as to establish a connection and control a call between the MSCs 10 and 15.

In step 300, a new BICC IAM call is incoming and an MSRN is acquired by performing an SRI request procedure for searching for called subscriber information. An adjacent MSC in FIG. 4 or an MSC not shown in FIG. 4 may allocate the MSRN to a called subscriber. A connection may be established with a called exchange connected to the called subscriber by allocating the MSRN. This step may be referred to as 'BICC outgoing'.

In step 305, the call is routed to the called exchange based on the MSRN allocated in step 300. The MSC 10 may rout the call to the MSC 15 by an IAM.

In step 310, the MSC 15 may route the call again by the IAM received in step 305. The MSC 15 may be connected to an MSC of the called exchange or an MSC of another exchange located between the MSC 15 and the called exchange.

The MSC 15 may receive an APM message including a Codec negotiation result and BncId information from the called exchange in step 315. A different amount of IP resources may be allocated in a different manner later based on the Codec negotiation result and the BncId information included in the APM message.

In step 320, the MSC 15 may request resource allocation for the T4 termination to the MGW 25 based on information included in the APM message received in step 315.

The MGW 25 may allocate IP resources based on the received APM message and transmit to the MSC 15 tunnel data carrying information about the allocated IP resources to the called exchange. The tunnel data may include at least one of allocated IP address information, port information, or media stream information.

The MSC 15 may transmit the tunnel data received in step 320 in an APM message to the called exchange in step 325. The destination of the APM message may be the called exchange. The MSC of the exchange that has received the APM message may receive tunnel data related to IP resources allocated by the MGW of the called exchange.

The MSC 15 may receive allocated tunnel information from the called exchange in step 330. The tunnel information may also be included in an APM message. In addition, the MSC 15 may transmit tunnel data of the received tunnel information to the MGW 25.

In step 335, the MSC 15 may request IP resource allocation for the T3 termination to the MGW 25, referring to the Codec negotiation result of the called exchange received in step 315. The MGW 25 may fail in allocating IP resources to the T3 termination and transmit an <ADD REPLY> Megaco message with a predetermined Error Code value set in it to the MSC 15. The Error Code may have a user-preset value and have the same format in all of MSCs and MGWs, as described before.

The MSC 15 may transmit a REL message to the MSC 10 of the preceding exchange to perform a call recovery procedure in step 340. Cause may be set to a preset value indicating an IP error in the REL message.

In steps 350 and 355, a Release Complete (RLC) message is received from the MSC 10 and the call recovery procedure is performed. Upon receipt of the RLC message, the MSC 10 may provide associated error information to its resource manager.

Figure 5:
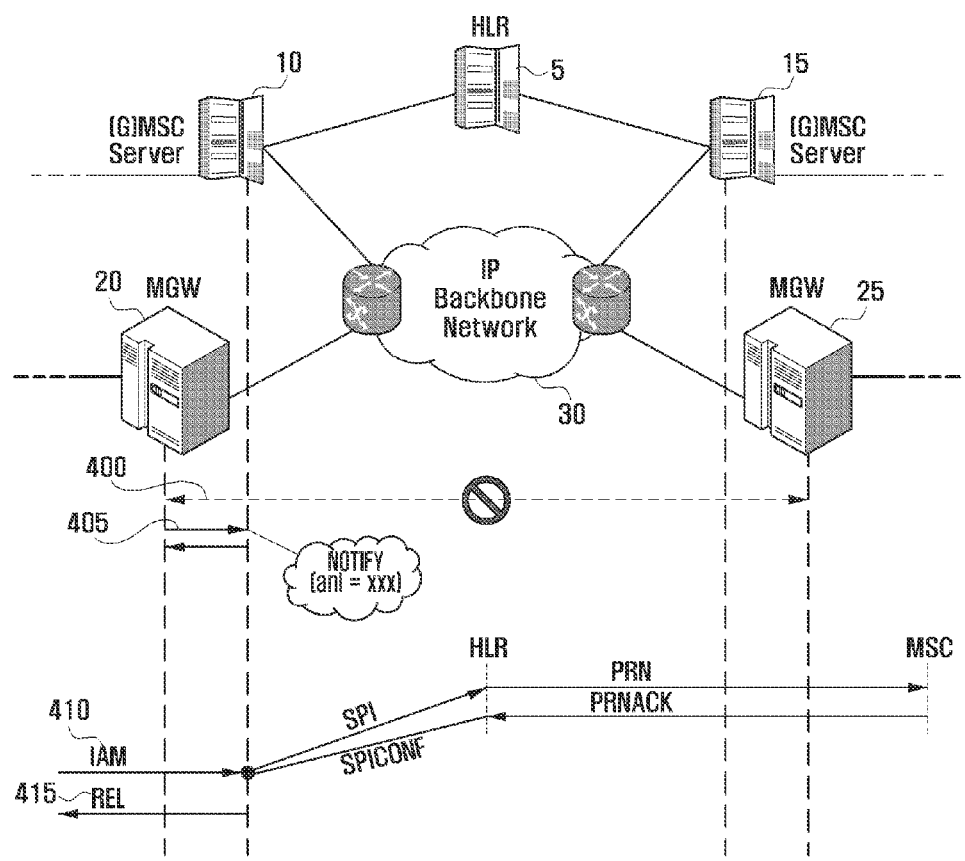
FIG. 5 illustrates a method for monitoring IP resource error information from a Media GateWay (MGW) according to an exemplary embodiment of the present invention.

FIG. 5 illustrates a method for monitoring IP resource error information from an MGW according to an exemplary embodiment of the present invention. In the method, an MGW detects an IP resource error and notifies an MSC of the detected IP resource error.

Referring to FIG. 5, the MSC 10 and the MSC 15 are connected to each other. The MSC 10 is connected to the MGW 20 and the MSC 15 is connected to the MGW 25, via IP backbone network 30 for communication. The HLR 5 may be configured so as to establish a connection and control a call between the MSCs 10 and 15.

In FIG. 5, in the situation where terminations have been allocated, associated tunnel data has been transmitted to MSCs, and thus an UP procedure has started, it is determined that an IP bearer error has occurred to a specific MGW by an MGW using its own monitoring function. If the UP procedure is repeatedly failed between adjacent MGWs, an IP bearer error may be detected in step 400.

If the MGW 20 determines that an IP bearer error has occurred between the MGW 20 and its connected MGW, the MGW 20 may transmit an error message including error information to the MSC 10 in step 405. The error message may be transmitted in a <NOTIFY> Megaco message.

Bearer error information may be represented by a preset value. Since the bearer error information may include an Adjacent Node ID (ani) value indicating the connected MGW experiencing the error, the MSC 10 may later isolate all of a route including an MSC interworking with the MGW having the error.

In step 410, a BICC IAM is received through the MSC 10. The BICC IAM may be processed in the same manner as in step 100 of FIG. 2.

Since the BICC outgoing route is isolated from services due to the IP bearer error, the call is not routed in an outgoing direction and is recovered using a REL message in step 415.

The BICC route directed to the specific MSC is isolated from services due to the IP bearer error. If a predetermined Alternative Route (AR) is not set in called Personal Information Exchange File (PFX) (identification number) information, the call is recovered. On the contrary, if the AR is set, the call can be routed through the AR instead of a direct route.

Figure 6:
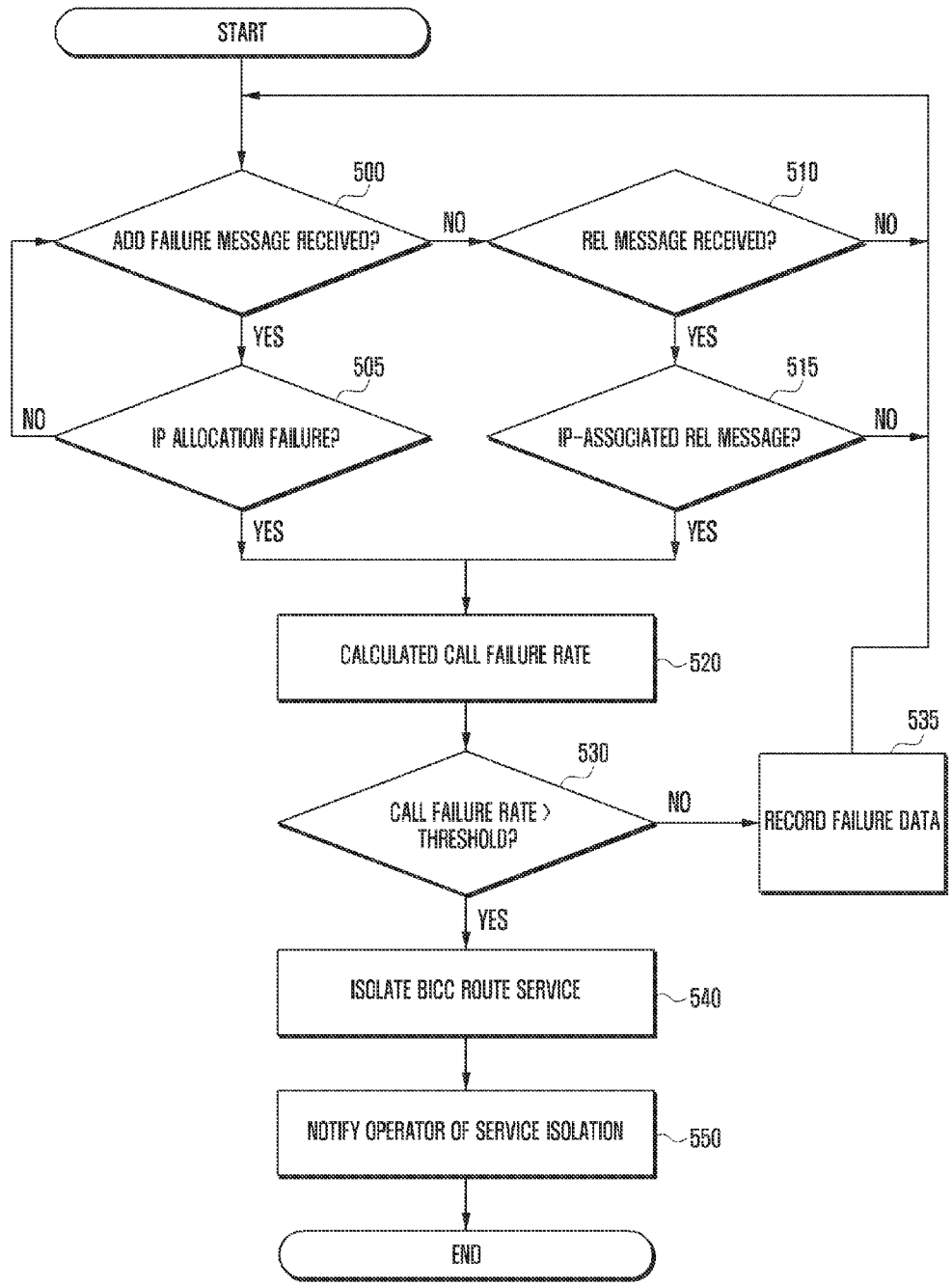
FIG. 6 is a flowchart illustrating an operation for monitoring an IP resource error in the BICC interworking environment using IP bearers according to an exemplary embodiment of the present invention.

FIG. 6 is a flowchart illustrating an operation for monitoring an IP resource error in the BICC interworking environment using IP bearers according to an exemplary embodiment of the present invention.

With reference to FIG. 6, a method for calculating a call failure rate at a resource manager of an MSC and isolating a BICC route service based on the call failure rate will be described below.

An MSC may receive an ADD failure message from an MGW in step 500. When the MGW fails in IP allocation, it may indicate the IP allocation failure by a predetermined Error Code value in an <ADD REPLY> Megaco message.

In the case where the MSC receives an <ADD REPLY> Megaco message in step 500, the MSC checks whether the Error Code of the <ADD REPLY> Megaco message indicates IP allocation failure in step 505. In the case of normal IP allocation, the MSC may return to step 500 to monitor receipt of the <ADD REPLY> Megaco message.

In the case where the MSC has not received an ADD failure message in step 500, the MSC may check whether a REL message has been received from an adjacent MSC in step 510. If the REL message has not been received, the MSC may return to step 500 to monitor receipt of the ADD failure message.

In step 515, the MSC may determine whether the REL message is associated with IP. If the REL message is not associated with IP, the MSC may return to step 500 to monitor receipt of the ADD failure message.

In case of IP allocation failure in step 505 or in case of a REL message associated with IP in step 515, this implies that a call failure has occurred due to an IP resource error. In step 520, the MSC may calculate a call failure rate, for example, by dividing the number of IP error-caused call failures by a total number of call attempts.

The call failure rate is compared with a threshold in step 530. The threshold may be preset according to a communication environment by a user. When IP errors and call recoveries happen frequently, a high threshold may be set. Otherwise, the threshold may be flexibly set according to a communication environment.

If the call failure rate is equal to or smaller than the threshold, the resource manager may record failure data in step 535 and the MSC returns to step 500 to monitor receipt of an ADD failure message. The resource manager may reside inside the MSC, record ADD failure reception information or IP-based REL reception information, and count the failure rates of the reception information.

If the call failure rate exceeds the threshold, the MSC may isolate a BICC route service experiencing the error in step 540. In this case, the call recovery procedure may further be performed.

When the BICC route service is isolated, the MSC notifies an operator of the service isolation so that an additional action may be taken in step 550.

Figure 7:
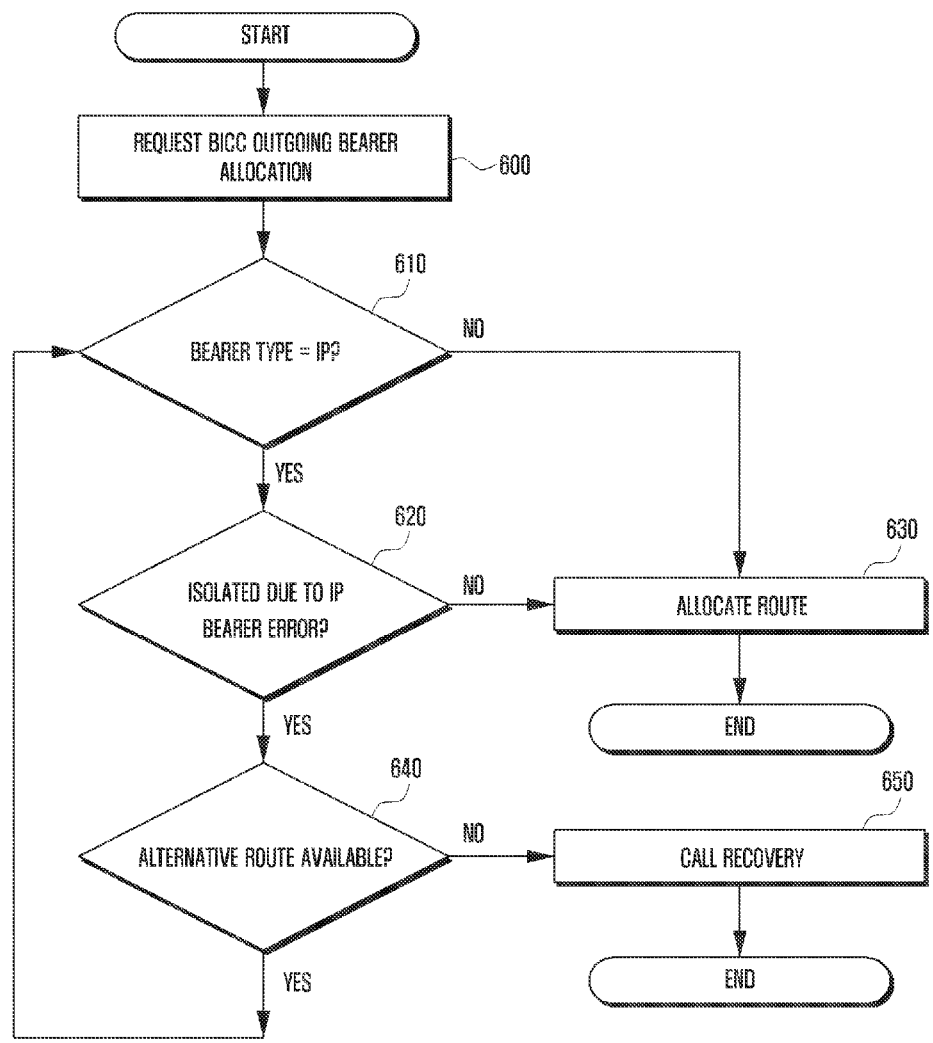
FIG. 7 is a flowchart illustrating a resource allocation operation of a resource manager according to an exemplary embodiment of the present invention.

FIG. 7 is a flowchart illustrating a resource allocation operation of a resource manager according to an exemplary embodiment of the present invention.

Referring to FIG. 7, the resource manager may request BICC outgoing bear allocation in step 600. The bearer allocation request may be transmitted between a plurality of MSCs.

In step 610, the resource manager may check whether the outgoing bearer is an IP bearer. If the bearer is not an IP type, the resource manager may allocate a route in step 630. The route allocation may be performed by generating an instance code (e.g., Circuit Identification Code (CIC)).

In the case of an IP bearer, the resource manager may determine whether the IP bearer has been isolated due to an error in step 620. If the IP bearer has not been isolated, the resource manager may secure a route in step 630.

On the contrary, if the IP bearer has been isolated in step 620, the resource manager may determine whether an AR is available in step 640. In the presence of an available AR, the resource manager may determine whether the bearer type of the AR is an IP type in step 610.

In the absence of an AR, a call recovery procedure may be performed in step 650. As described before, the call recovery procedure may be performed by exchanging REL and RLC messages.

Figure 8:
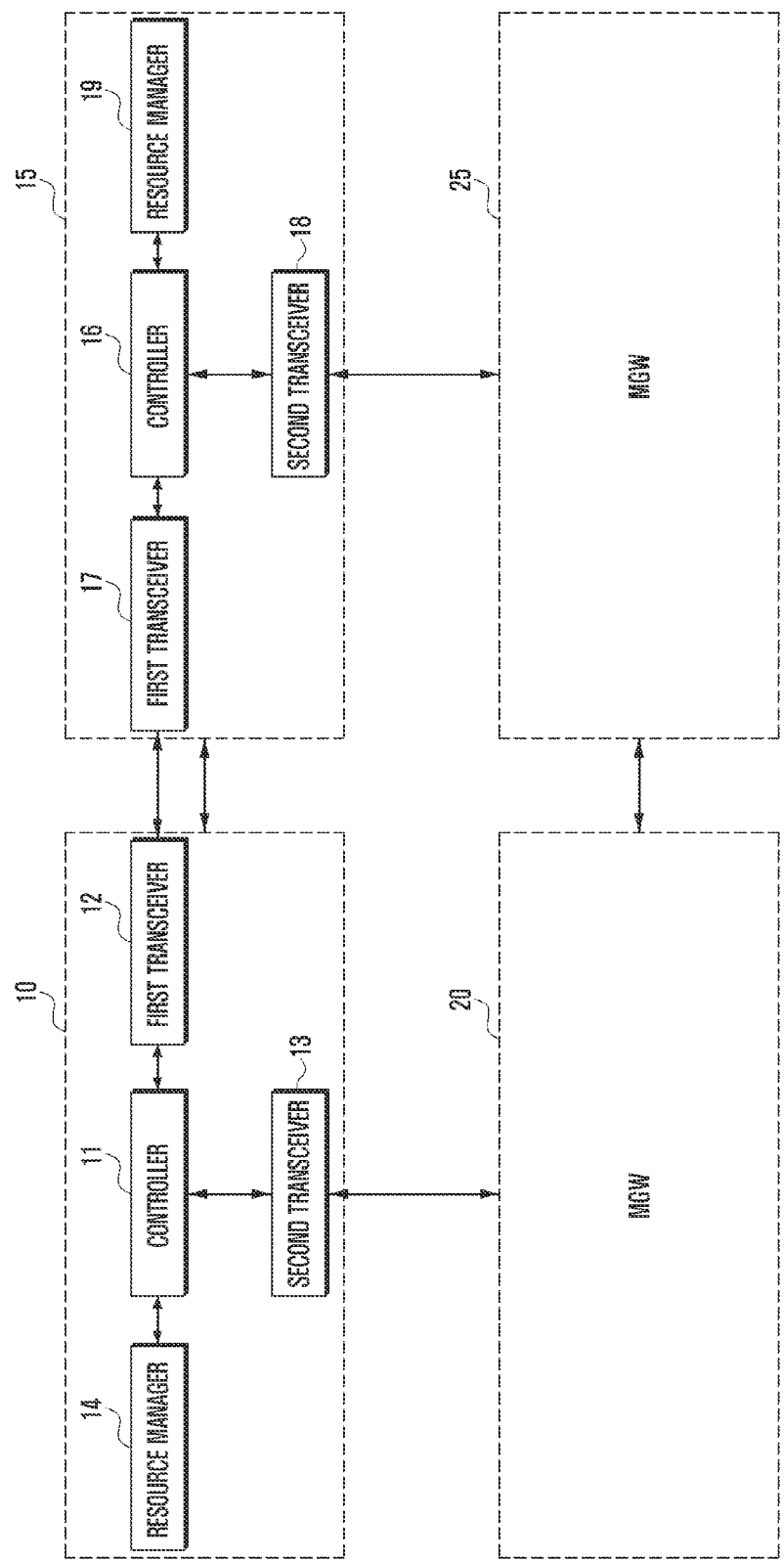
FIG. 8 is a block diagram of a Mobile Switching Center (MSC) and an MGW, illustrating connectivity between the MSC and the MGW, according to an exemplary embodiment of the present invention.

FIG. 8 is a block diagram of an MSC and an MGW, illustrating connectivity between the MSC and the MGW according to an exemplary embodiment of the present invention.

Referring to FIG. 8, the MSC 10 may include a controller 11 for providing overall control to the MSC 10, a first transceiver 12 for transmitting data to and receiving data from another MSC 15 under the control of the controller 11, a second transceiver 13 for transmitting data to and receiving data from the MGW 20 under the control of the controller 11, and a resource manager 14 for recording information indicating whether an IP resource allocation has been failed and determining an IP bearer error under the control of the controller 11.

Besides the MSC 15, the MSC 10 may be connected to a plurality of MSCs. The MSC 10 may also be connected to a plurality of MGWs besides the MGW 20.

The MSC 15 may include at least one of a controller 16, a first transceiver 17, a second transceiver 18, or a resource manager 19. The MSC 15 may be connected to the MGW 25 through the second transceiver 18.

The MSC 10 may receive information indicating whether an IP error has occurred in a REL message from the MSC 15 through the first transceiver 12. The received REL message is stored in the resource manager 14. The controller 11 calculates an IP call failure rate. If the IP call failure rate exceeds a preset threshold, the controller 11 may determine that an IP error has occurred. Thus a recovery procedure or an AR procedure may be performed.

The MSC 10 may receive a message indicating that the MGW 20 has failed in IP resource allocation through the second transceiver 13. The IP resource allocation failure message may be an <ADD REPLY> Megaco message. Upon receipt of the <ADD REPLY> Megaco message, the controller 11 stores the <ADD REPLY> Megaco message in the resource manager 14 and calculates the IP allocation failure rate of the MGW 20. If the IP allocation failure rate exceeds a threshold, the controller 11 may perform a recovery procedure. In addition, the controller 11 may notify the MSC 15 of the IP allocation failure through the first transceiver 12.

As is apparent from the above description of the exemplary embodiments of the present invention, when an error occurs in a BICC environment using IP bearers, the error can be detected and handled appropriately without intervention of a manager. Therefore, system stability may be increased and resource and load management may be facilitated.

While the present invention has been shown and described with reference to certain exemplary embodiments thereof, it will be understood by those of ordinary skill in the art that various changes in form and details may be made therein without departing from the spirit and scope of the present invention as defined by the following claims and their equivalents.

What is claimed is:

1. A call monitoring method for detecting an error at a Mobile Switching Center (MSC) in a Bearer-Independent Call Control (BICC) environment using an Internet Protocol (IP) as a bearer, the method comprising:
   receiving connection information about a called exchange from an other MSC;
   requesting IP resource allocation for configuring a termination to a Media GateWay (MGW) controlled by the MSC based on the received connection information about the called exchange;
   determining, upon receipt of a resource allocation failure message from the MGW, whether a cause of a resource allocation failure is an IP allocation error;
   setting associated IP resources as having an IP allocation error, if an IP resource allocation failure rate received from the resource manager exceeds a predetermined threshold;
   isolating a BICC route including the IP resources from a service, if the IP resources are associated as having the IP allocation error; and
   transmitting the resource allocation failure message to a resource manager, if the cause of the resource allocation failure is the IP allocation error,
   wherein the isolating of the BICC route comprises transmitting error information about the IP resources associated as having the IP allocation error to the other MSC.

2. The method of claim 1, wherein the connection information about the called exchange includes a Codec negotiation result with the called exchange and a backbone network connection Identifier (ID).

3. The method of claim 1, wherein the resource allocation failure message is a predetermined error code value in an <ADD REPLY> Megaco message.

4. The method of claim 1, further comprising:
   transmitting a recovery message for call recovery to the other MSC, upon receipt of the resource allocation failure message.

5. The method of claim 4, wherein the recovery message is a predetermined cause value in a Release (REL) message.

6. The method of claim 4, further comprising:
   receiving a modify message from the other MSC to which the recovery message has been transmitted; and
   requesting IP resource allocation for configuring a termination based on the received modify message to the MGW by the modify message.

7. The method of claim 1, further comprising:
   receiving an error message indicating an IP bearer error in a connection to an other MGW connected to the MGW controlled by the MSC from the MGW controlled by the MSC; and
   isolating a route directed to an MSC connected to the other MGW based on the received error message.

8. The method of claim 7, wherein the error message is transmitted in a <NOTIFY> Megaco message.

9. A call monitoring method for detecting an error at a Mobile Switching Center (MSC) in a Bearer-Independent Call Control (BICC) environment using an Internet Protocol (IP) as a bearer, the method comprising:
   receiving an error message indicating an IP bearer error in a connection to an other Media GateWay (MGW) connected to an MGW controlled by the MSC from the MGW controlled by the MSC;
   setting associated IP resources as having an IP allocation error, if an IP resource allocation failure rate received from a resource manager exceeds a predetermined threshold;
   isolating a BICC route including the IP resources from a service, if the IP resources are associated as having the IP allocation error; and
   isolating a route directed to an MSC connected to the other MGW based on the received error message,
   wherein the isolating of the BICC route comprises transmitting error information about the IP resources associated as having the IP allocation error to the other MSC.

10. The method of claim 9, wherein the error message is transmitted in a <NOTIFY> Megaco message.

11. A call monitoring apparatus for detecting an error at a Mobile Switching Center (MSC) in a Bearer-Independent Call Control (BICC) environment using an Internet Protocol (IP) as a bearer, the apparatus comprising:
   a first transceiver for transmitting and receiving connection information about a called exchange from an other MSC;
   a second transceiver for transmitting and receiving an IP resource allocation request for configuring a termination and information indicating whether an IP resource allocation has been successful to and from a Media GateWay (MGW) controlled by the MSC based on data transmitted and received through the first transceiver;

a resource manager for storing the information indicating whether the IP resource allocation has been successful, transmitted and received through the second transceiver; and a controller for determining whether an IP error has occurred based on data stored in the resource manager, the controller being configured to:

set associated IP resources as having an IP allocation error, if an IP resource allocation failure rate received from the resource manager exceeds a predetermined threshold; and isolate a BICC route including the IP resources from a service, if the IP resources are associated as having the IP allocation error, wherein the isolating of the BICC route comprises transmitting error information about the IP resources associated as having the IP allocation error to the other MSC.

12. The apparatus of claim 11, wherein the controller detects an IP resource allocation failure of an other MGW controlled by the other MSC based on data transmitted and received through the first transceiver.

13. The apparatus of claim 11, wherein, if an IP resource allocation failure rate is equal to or greater than a threshold, the resource manager determines that associated IP resources have an IP error.

* * * * *